United States Patent [19]
von Strandtmann et al.

[11] 3,886,183
[45] May 27, 1975

[54] PROCESS FOR PREPARING POLYCYCLIC 3-FORMYL GAMMA-PYRONE DERIVATIVES

[75] Inventors: Maximilian von Strandtmann, Rockaway; Sylvester Klutchko, Hackettstown, both of N.J.

[73] Assignee: Warner-Lambert Company, Morris Plains, N.J.

[22] Filed: June 19, 1974

[21] Appl. No.: 480,984

Related U.S. Application Data
[63] Continuation-in-part of Ser. No. 351,915, April 18, 1973, abandoned.

[52] U.S. Cl. .............................. 260/345.2; 424/283
[51] Int. Cl. .............................................. C07d 7/32
[58] Field of Search ................................ 260/345.2

[56] References Cited
UNITED STATES PATENTS
3,798,240   3/1974   von Strandtmann et al. ... 260/345.2

*Primary Examiner*—John M. Ford
*Attorney, Agent, or Firm*—Albert H. Graddis; Frank S. Chow; Anne M. Kelly

[57] ABSTRACT
Compounds of the formula I:

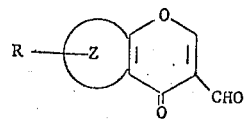

I wherein R represents hydrogen, halogen, lower alkyl, or lower alkoxy and the Z ring has one of the following structures:

(a)

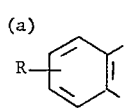

(b)

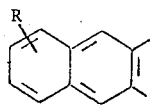

(c)

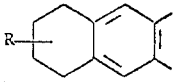

(d)

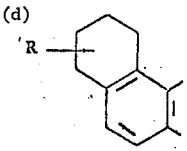

or (e)

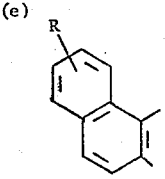

are prepared by treating a compound of the formula II:

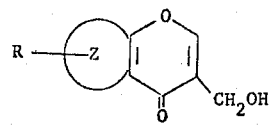

II wherein R and the Z ring are as defined above with an oxidizing agent. These compounds of the formula I are useful in the treatment of gastric hyperacidity and in the treatment of allergic conditions.

2 Claims, No Drawings

PROCESS FOR PREPARING POLYCYCLIC 3-FORMYL GAMMA-PYRONE DERIVATIVES

CROSS-REFERENCE TO RELATED APPLICATIONS

This application is a continuation-in-part of copending U.S. Ser. No. 351,915, filed Apr. 18, 1973, now abandoned.

The present invention relates to a process for preparing compounds of the formula I:

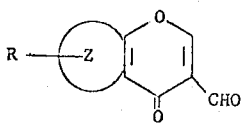

wherein R represents hydrogen, halogen, lower alkyl, or lower alkoxy and the Z ring has one of the following structures:

(a) 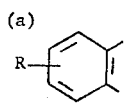

(b) 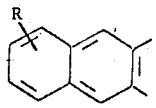

(c) 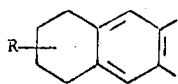

(d) 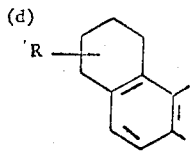

or (e) 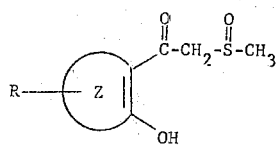

wherein R in formulas (a), (b), (c), (d) and (e) is as defined above, by oxidizing a compound of the formula II:

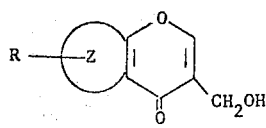

wherein R and the Z ring are as defined above, with an oxidizing agent selected from the group consisting of sodium dichromateglacial acetic acid, concentrated nitric acid, and potassium persulfate. Preferably the oxidizing agent is employed in at least an equal molar ratio to the starting compound II, and the reaction is conducted at a temperature below 80°C.

The 3-(hydroxymethyl)chromone or gamma-pyrone starting materials II and their precursors used in the process of this invention (and various derivatives thereof, containing one or more substituents on the phenyl or naphtho rings) are described more fully in copending U.S. application Ser. No. 112,765, filed Feb. 4, 1971, now abandoned; and in continuation-in-part of said Ser. No. 112,765, application Ser. No. 309,329, filed Nov. 24, 1972, now U.S. Pat. No. 3,798,240; in continuation-in-part of said Ser. No. 309,329, application Ser. No. 387,861, filed Aug. 13, 1973; and in U.S. application Ser. No. 392,152, filed Aug. 27, 1973.

Typical compounds described in aforementioned U.S. Ser. Nos. 112,765, 309,329, 387,861 and 392,152 include:

3-(hydroxymethyl)chromone;
6-hydroxy-3-(hydroxymethyl)chromone;
6-chloro-3-(hydroxymethyl)chromone;
3-(hydroxymethyl)-6-iodochromone;
3-(hydroxymethyl)-6-methoxychromone;
6-bromo-3-(hydroxymethyl)chromone;
7-chloro-3-(hydroxymethyl)chromone;
3-(hydroxymethyl)-8-isopropylchromone;
3-(hydroxymethyl)-7-methoxychromone;
3-(hydroxymethyl)-8-methoxychromone;
8-chloro-3-(hydroxymethyl)chromone;
6-fluoro-3-(hydroxymethyl)chromone;
3-(hydroxymethyl)-6-(1,1,3,3-tetramethylbutyl)-chromone;
3-(hydroxymethyl)-8-methylchromone;
3-(hydroxymethyl)-6,8-dimethylchromone;
3-(hydroxymethyl)-6-methylchromone;
3-(hydroxymethyl)-5-methoxychromone.
3-(hydroxymethyl)-4H-naphtho[2,3-b]pyran-4-one
3-(hydroxymethyl)-4H-naphtho[1,2-b]pyran-4-one
7,8,9,10-tetrahydro-3-(hydroxymethyl)-4H-naphtho[1,2-b]pyran-4-one
6,7,8,9-tetrahydro-3-(hydroxymethyl)-4H-naphtho[2,3-b]pyran-4-one The above-mentioned compounds II are prepared by reacting correspondingly substituted compounds having the formula III:

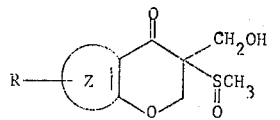

wherein R and Z are as defined above, with 2 moles of formaldehyde under basic conditions to obtain an intermediate compound having the formula IV:

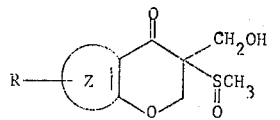

wherein R and Z are as defined above; and treating compound IV thermally to eliminate methylsulfenic acid (CH₃SOH) and obtain the desired starting materials II used in the process of this invention.

Compounds having the formula III above are prepared by (A) reacting dimethyl sulfoxide with sodium hydride in an inert solvent; (B) adding to reaction mixture (A) an appropriately substituted salicylic ester or ortho-hydroxynaphthoate (or tetrahydro derivative thereof); (C) maintaining the reaction mixture of (B) at a temperature of up to 50°C; (D) reducing the solubility of the sodium salt reaction product of (C) by the addition of a non-polar solvent; and (E) collecting the precipitate formed. A similar preparation has been reported by Becker et al., J.A.C.S. 85: 3410 (1963).

Substituted and unsubstituted salicylic esters are known or easily prepared by known methods. Substituted and unsubstituted 1-hydroxy-2-naphthoates (Ber. 20: 2700 (1887) substituted and unsubstituted 3-hydroxy-2-naphthoates (Ber. 25: 3635 (1892) and the corresponding 5,6,7,8-tetrahydro derivatives thereof (Ann. 426: 147, 158 (1922) are also known or easily prepared by known methods.

The final compounds I produced according to the process of this invention are more fully described in certain co-pending applications. For example, 3-formylchromone derivatives of the formula I wherein R represents halogen, lower alkyl or lower alkoxy and the Z ring is (a):

(a) 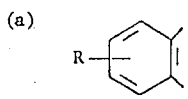

are more fully described in copending U.S. application Ser. No. 352,149, filed Apr. 18, 1973; and 3-formyl-gamma-pyrone derivatives of the formula I wherein R represents hydrogen, lower alkyl and lower alkoxy, and the Z ring is (b), (c), or (d):

(b) 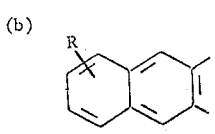

or (d) 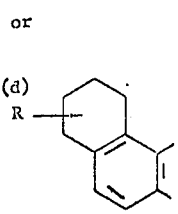

(c) 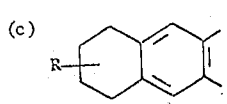

are more fully described in copending U.S. application Ser. No. 352,135, filed Apr. 18, 1973. In addition, a 3-formyl-gamma-pyrone derivative wherein R represents hydrogen and the Z ring is (e):

(e) 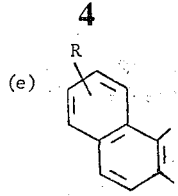

is reported in J. Het. Chem. 6: 375–377, June, 1969, prepared by another method. The therapeutic activities of the last mentioned known compound and its R-substituted derivatives, wherein R represents lower alkyl or lower alkoxy, have been disclosed and claimed in copending Ser. No. 352,135, filed Apr. 18, 1973.

Thus, the compounds of formula I prepared according to the novel process of this invention have been found to reduce histaminic responses to antigen challenge by inhibiting antibody-antigen reactions in mammals such as rats or guinea pigs upon oral or parenteral administration. When tested in accordance with the procedure of Mota, Life Sciences, 7, 465, (1963) and Ovary, Proc. Soc. Exptl. Biol. Med., 81, 584, (1952) therapeutic compositions containing these compounds are effective at dosages of 5 mg to 50 mg/kg of body weight.

Pharmaceutical compositions containing the compounds of formula I are therefore useful in the management of allergic reactions such as bronchial asthma. To treat bronchial asthma, a dose of 5 mg to 50 mg/kg, administered orally or parenterally is suggested; in addition, aerosol administration of lower doses may be used. The dosage may be varied depending upon severity of the condition and the weight, age and sex of the patient being treated.

In use, the compounds of formula I may be combined with a parenterally acceptable vehicle, such as a gum tragacanth saline suspension, to provide dosage forms suitable for parenteral administration; or they may be combined with pharmaceutical diluents such as lactose, cornstarch, and the like and formulated into tablet or capsule dosage forms. In order to enhance their therapeutic spectrum, the compounds of formula I may be combined with sympathomimetic agents such as isoprenaline or combined with steroids such as cortisone and its derivatives.

The compounds of formula I also exhibit antisecretory effects and are therefore useful in relieving gastric hyperacidity. Gastric hyperacidity has generally been described as a factor which contributes to peptic ulcer. The compounds of formula I, when administered to mammals in a manner as described below, have been found to inhibit the gastric secretion of hydrochloric acid and are therefore effective in eliminating the resulting acidity in the stomach.

At a dosage of 20 mg/kg, administered intraperitoneally the subject compositions are effective in reducing gastric acidity in the pylorus ligated rat when tested according to the procedure of H. Shay, Gastroenterology, 5, 43, (1945).

Pharmaceutical compositions containing the compounds of formula I are thus indicated in the management of gastric hyperacidity and the treatment of peptic ulcer resulting from such hyperacidity. For parenteral administration, the pharmaceutical compositions containing the compounds of formula I may be administered as aqueous suspensions for intramuscular injection. These are prepared, for example, by suspending the active ingredient in sterile water and packaging in ampules so as to provide a concentration of 1,000 mg of the active ingredient per dosage unit.

In all of the above formulas I, II, (a), (b), (c), (d), and (e), the R group definitions may be more fully described as follows: the term "lower alkyl" is meant to include lower aliphatic hydrocarbons having 1 to 4 carbon atoms in the carbon chain, such as methyl, ethyl, propyl, isopropyl, butyl, or isobutyl. This definition for lower alkyl also applies to the lower alkyl portion of "lower alkoxy." The term "halogen" is meant to include bromine, chlorine, iodine and fluorine.

To further illustrate the practice of this invention, the following examples are included:

EXAMPLE I

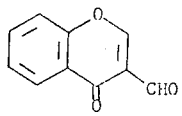

Preparation of 3-Formylchromone

A quantity of 35.2 g. (0.2 mole) of 3-(hydroxymethyl)-chromone is dissolved in 250 ml of concentrated nitric acid with stirring at 25°C. There is no initial heat of reaction. The temperature gradually rises to 30°C over the next several minutes and is kept there for about 5 minutes with ice-acetone bath cooling. Water, 600 ml, is added to the reaction solution. The separated, pale yellow solid is filtered, washed well with water and dried to give 25 g. of crude aldehyde melting at 145°–148°.

Purification to remove a minor, slow-moving spot on thin-layer chromatography (ethylacetate-silica gel) is effected by dissolution of above 25 g. in 500 ml. of methylene chloride and filtration through a silica gel column about 10 cm. long by about 5.0 cm. diameter) and washing with 500 ml. methylene chloride. Concentration of the filtrate gives 20.0 g. (68%) of pure aldehyde melting at 151°–152°C.

Anal. Calcd. for $C_{10}H_6O_3$: C, 68.97; H, 3.47. Found: C, 68.76; H, 3.19.

[Compound prepared by another method, reported in Eiden, F. et al., Arch. der Pharm. 300: 806 (1967)]

EXAMPLE II

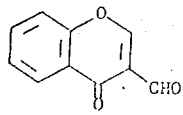

Preparation of 3-Formylchromone

A mixture of 40 g. (0.228 mole) of 3-(hydroxymethyl)chromone, 3.5 liters of water and 1.0 g. of silver nitrate catalyst is heated to 50°C. A slurry of 61.6 g. (0.228 mole) of sodium persulfate in 500 ml of water is added and the mixture is heated at 85°C. for 4 hours. The supernatant is decanted from the separated crude product. Trituration, filtration and drying yields 14.0 g. of crude aldehyde. Purification is effected by filtration of a chloroform solution through a layer of silica gel. Concentration gives 9.0 g. (23%) of aldehyde; mp 148°–151°C. Trituration with ethylacetate and filtration gave pure aldehyde; wt. 7.0 g.; mp 151°–152°C. [Compound prepared by another method, reported in Eiden, F. et al., Arch. der Pharm. 300: 806 (1967)]

EXAMPLE III

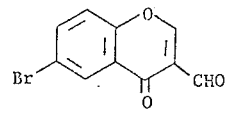

Preparation of 6-Bromo-3-formylchromone

A warm (40°C.) solution of 29.8 g. (0.1 mole) of sodium dichromate dihydrate in 80 ml of glacial acetic acid is added over a 5-minute period to a stirred, warm (60°C.) solution of 25.5 g. (0.1 mole) of 6-bromo-3-(hydroxymethyl)chromone in 300 ml of glacial acetic acid. The temperature rises to 72°C. After one-half hour, water (1400 ml) is added and the mixture is heated at 80°C. for a few minutes. The mixture is cooled and filtered to give 13.6 g. (54%) of good quality aldehyde. Recrystallization from ethyl acetate gives pure 6-bromo-3-formylchromone having mp 186°–188°C.

Anal. Calcd for $C_{10}H_5BrO_3$: C, 47.46; H, 1.99; Br, 31.58; Found: C, 47.19; H, 1.99; Br, 31.56.

EXAMPLE IV

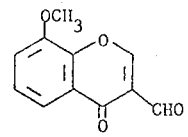

Preparation of 3-Formyl-8-methoxychromone

A quantity of 41.2 g (0.2 mole) of 3-(hydroxymethyl)-8-methoxychromone is heated with 600 ml of glacial acetic acid to 50°C to dissolve. With stirring, a warm solution (70°) of 59.6 g (0.2 mole) of sodium dichromate dihydrate in 200 ml of glacial acetic acid is added over a period of 5 minutes, preventing the temperature from going over 80°C with cooling. After 20 minutes, about one-half of the acetic acid is distilled off at reduced pressure. Water (500 ml) is added to precipitate 13.1 g (32%) of crude aldehyde. Upon addition of more water to the filtrate, an additional 6.4 g of crude is obtained; total weight 19.4 g (48%). Purification is effected by dissolution in 150 ml of warm chloroform and filtration through a layer of silica gel; mp 171°–175°C. Recrystallization from acetonitrile gave pure aldehyde; mp 174°–176°C.

Anal. Calcd. for $C_{11}H_8O_4$: C, 64.70; H, 3.95; Found: C, 64.81; H, 3.91.

EXAMPLE V

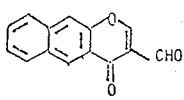

Preparation of 4-Oxo-4H-naphtho[2,3-b]pyran-3-carboxaldehyde

A slurry of 1.6g (0.007 mole) of 3-(hydroxymethyl)-4H-naphtho[2,3-b]pyran-4-one in 10 ml of glacial acetic acid is added to a stirred solution of 2.11 g (0.007 mole) of sodium dichromate dihydrate, keeping the temperature at 40°C. with mild cooling. After the initial exotherm, the reaction is stirred at room temperature overnight. Water (100 ml) is added and the resulting turbid solution is heated to 75°C. to generate a precipitate. The cooled mixture is filtered and the crude product (1.4g) is purified by filtration of a methylene chloride solution through a layer of silica gel, wt. 0.22g (14%), mp 215°–218°C. Recrystallization from ethylacetate gives pure aldehyde; mp 220°–222°C.

Anal. Calcd: $C_{14}H_8O_3$: C, 75.00; H, 3.60. Found: C, 74.88; H, 3.67.

EXAMPLE VI

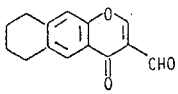

Preparation of 3-Formyl-6,7,8,9-tetrahydro-4H-naphtho[2,3-b]pyran-4-one

A mixture of 2.3g (0.01 mole) of 3-(hydroxymethyl)-6,7,8,9-tetrahydro-4H-naphtho[2,3-b]pyran-4-one and 15 ml of glacial acetic acid is added to a solution of 2.98g (0.01 mole) of sodium dichromate dihydrate in 15 ml of glacial acetic acid, keeping the temperature at about 50°C. with mild cooling. After 15 minutes, the reaction is heated to 60°C. for 15 minutes, water (100 ml) is added and the mixture is heated at 50°C. for 5 minutes. The separated solid is filtered, washed with water and dried; wt. 1.6 g (70%); mp 120°–123°C. Purification is effected by dissolving in methylene chloride and filtering through a layer of silica gel. The pure aldehyde is obtained by removal of solvent from the filtrate; mp 128°–130°C.

Anal. Calcd: $C_{14}H_{12}O_3$: C, 73.67; H, 5.30. Found: C, 73.54; H, 5.20.

EXAMPLE VII

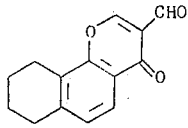

Preparation of 3-Formyl-7,8,9,10-tetrahydro-4H-naphtho[1,2-b]-pyran-4-one

This compound is prepared by adding a mixture of 23.0 g (0.1 mole) of 3-(hydroxymethyl)-7,8,9,10-tetrahydro-4H-naphtho[1,2-b]pyran-4-one and 150 ml of glacial acetic acid to a solution of 29.8 g (0.1 mole) of sodium dichromate dihydrate in 150 ml of glacial acetic acid, keeping the temperature at about 50°C with cooling. After the initial exotherm, the reaction is heated at 60°C for one-half hour, water (1-liter) is added, and the mixture is heated at 75°C for about one-half hour to generate a precipitate. The cooled mixture is filtered and the crude product is purified by dissolving in methylene chloride and filtering through a layer of silica gel. The aldehyde is obtained by removal of solvent from the filtrate.

EXAMPLE VIII

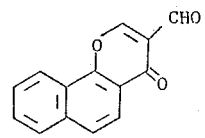

Preparation of 3-Formyl-4H-naphtho[1,2-b]pyran-4-one

A solution 8.44 g (0.028 mole) of sodium dichromate dihydrate in 30 ml of glacial acetic acid is added to a stirred mixture of 6.4 g (0.028 mole) of 3-(hydroxymethyl)-4H-naphtho[1,2-b]pyran-4-one and 40 ml glacial acetic acid. The reaction is exothermic. The temperature is prevented from going over 50°C with cooling. After one-half hour at 35°–50°C the solution is heated to 70°C for one-half hour and water (200 ml) is added. The mixture is cooled and the separated crude solid is collected. Purification is effected by filtration of a methylene chloride solution through a layer of silica gel. In this fashion 1.0 g (16%) of pure aldehyde is obtained, mp 178°–180°C.

Anal. Calcd: $C_{14}H_8O_3$: C, 74.99; H, 3.60. Found: C, 75.08; H, 3.74.

EXAMPLE IX

Evaluation of Gastric Anti-ulcer Activity (in vivo)

Male rats are subjected to ligation of the gastropyloric junction. This operation causes the secretion of large quantities of gastric juice which leads to mucosol erosion in the ruminal area of the rat's stomach. The compound to be tested is given intraperitoneally (I.P.) at the time of ligation. The rats are sacrificed after 18 hours and their stomachs are removed. The efficacy of the test compound is evaluated by its ability to minimize the erosion of stomach mucosa and/or decrease the volume of acid secretions below harmful levels. Results with compounds of Examples I* and III** are indicated in Table I below:

TABLE I

| Compound | Dose mg/kg | Route | % Decrease of Acid Volume |
|---|---|---|---|
| Ex. I* | 20 | I.P. | 47.2 |
| Ex. III** | 20 | I.P. | 31.7 |

*This compound, 3-formylchromone, is also prepared in Example II using an alternate oxidizing agent.
**6-Bromo-3-formylchromone

EXAMPLE X

Anti-allergy Evaluation in the Passive Cutaneous Anaphylaxis (PCA)

Rats, passively sensitized with reagin type antibodies, are pretreated wtih the test compound and challenged with antigen-Evans blue mixture. After 30 minutes the animals are sacrificed and the skin containing the four sensitizing sites is removed. The activity is evaluated by the ability of the compound to minimize tissue reaction to challenge. This is indicated by the decrease in size and coloration of the areas around injection sites when compared to controls. Results with compounds of Examples I* and III** are indicated in Table 2 below:

TABLE 2

| Compound | Dose mg/kg | Route | Inhibition of Passive Cutaneous Anaphylaxis |
|---|---|---|---|
| Ex. III** | 50 | I.P. | 51% |
| Ex. I* | 100 | Per Os | 35% |

*This compound, 3-formylchromone, is also prepared in Example II using an alternate oxidizing agent.
**6-Bromo-3-formylchromone Human atopic allergy has been shown to be due to a specific class of antibody (IgE), which is heat labile and fixes for long times in the skin after passive transfer with the serum of sensitive individuals. A similar type of antibody is found in the rat. This antibody is non-precipitating. Therefore, it is a most unique type. This antibody releases histamine and serotonin from mast cells in the rat as it does in the human. Thus, any drug which interferes with the passive cutaneous anaphylaxis reaction in the rat becomes of interest for treatment of human allergy.

We claim:

1. A process for preparing a compound having the formula I:

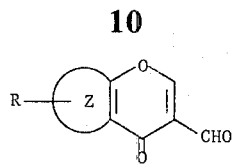

wherein R represents hydrogen, halogen, lower alkyl, or lower alkoxy and the Z ring has one of the following structures:

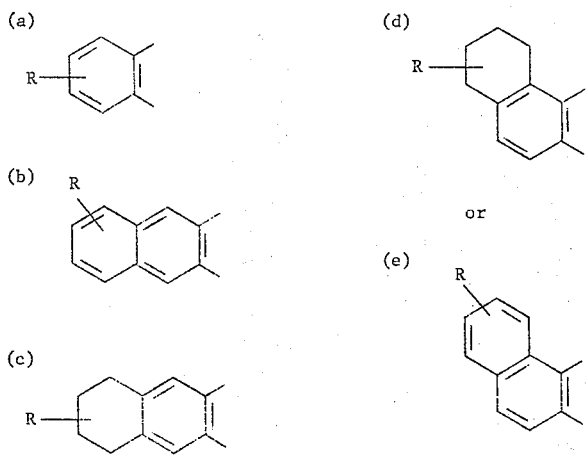

wherein R in formulas (a), (b), (c), (d) and (e) is as defined above, which comprises oxidizing a compound of the formula II:

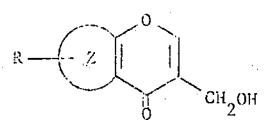

wherein R and the Z ring are as defined above, using an oxidizing agent selected from the group consisting of sodium dichromateglacial acetic acid, concentrated nitric acid, and potassium persulfate.

2. A process according to claim 1 wherein the oxidizing agent is employed in at least an equal molar ratio to the starting compound II and the reaction is conducted at a temperature below 80°C.

* * * * *